Patented Dec. 6, 1949

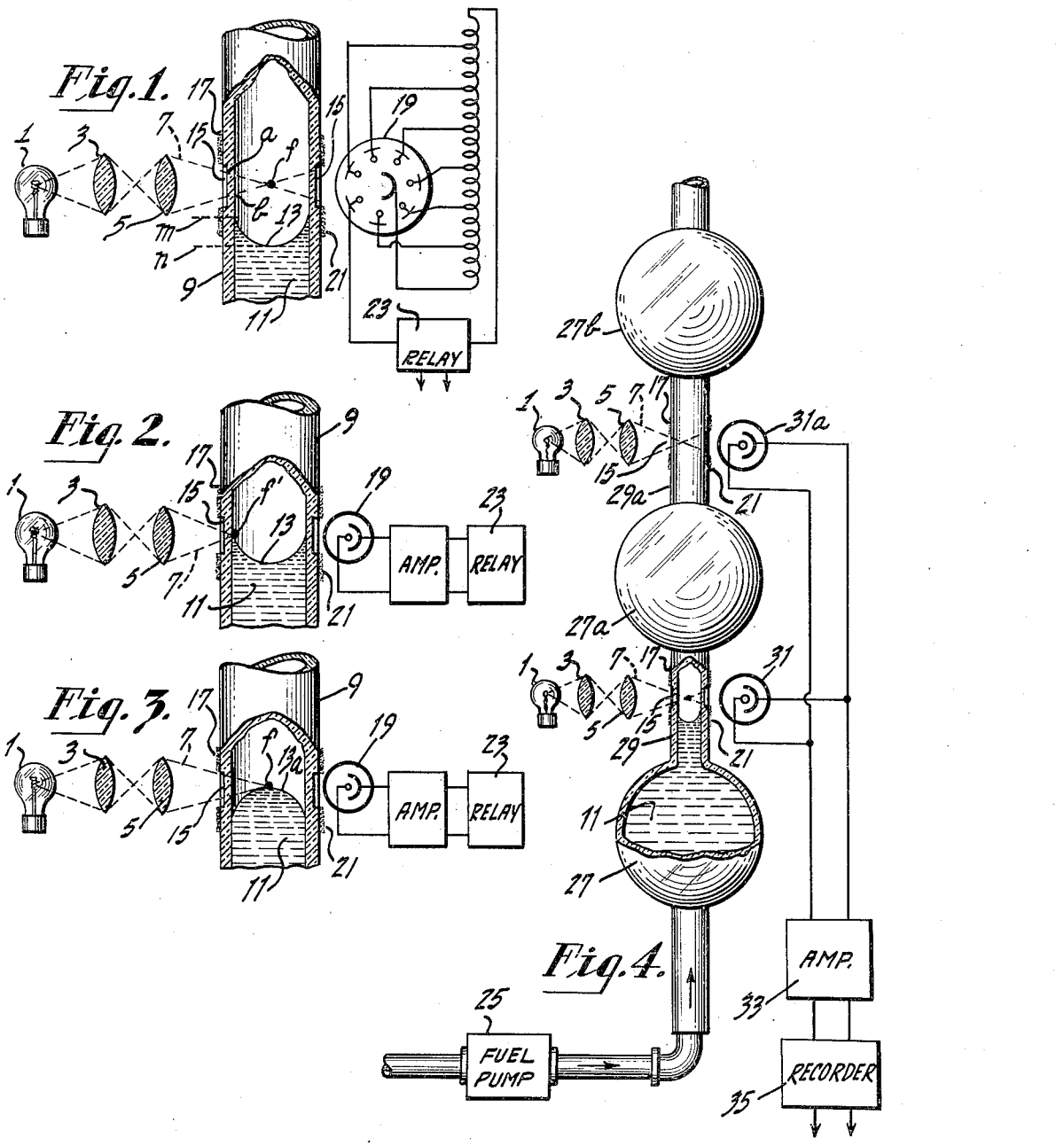

2,490,627

UNITED STATES PATENT OFFICE 2,490,627

PHOTOELECTRIC LIQUID LEVEL INDICATOR

Alf H. Hofberg, Medford, N. J., assignor to Radio Corporation of America, a corporation of Delaware Application June 30, 1945, Serial No. 602,609

11 Claims. (Cl. 250—218)

My invention relates to improvements in the art of determining the quantity or the rate of flow of a liquid as a function of its level.

The prior art is replete with electrical and photo-electrical systems for detecting variations in the height of a liquid column. Irrespective of the advantages claimed for these various systems, it may be said, generally, that each possesses one or more inherent disadvantages. By way of example, while measuring systems which employ electrical contacts mounted in the path of the liquid are quite accurate, they cannot be used in connection with combustible liquids, such as gasoline. On the other hand, while electrical systems wherein the dielectric properties of the liquid are employed to vary the capacitance between two spaced electrodes may be said to operate independently of the nature of the liquid, they are relatively insensitive to minor variations in the height of the liquid column. Most photo-electric systems are similarly insensitive and, furthermore, are applicable only to colored liquids.

In an effort to provide a truly sensitive indicator system, applicable to colorless liquids, it has heretofore been proposed (see Styer U. S. Patent 1,955,315) to provide a manometer column of varying cross-sectional area and to utilize the resultant varying curvature of the meniscus of the liquid as a concave reflector for controlling the quantity of light impinging upon a photocell which is mounted above the level of the liquid. While Styer's photoelectric indicator is quite sensitive to changes in the level of a colorless, or, indeed, a colored liquid, the fact that it requires the use of a manometer tube of special construction makes it expensive if not entirely unsuited for use in connection with existing fluid systems. Furthermore, in the above described and other embodiments of Styer's invention, the necessity for mounting the photocell above and in register with the liquid column prevents its application to a closed fluid system or to a tandem system such as may require the mounting of one photocell above the other for measuring the rate of flow of the liquid.

Accordingly, the principal object of my invention is to obviate the foregoing and other less apparent disadvantages inherent in present-day liquid-level indicators and to provide an improved method of and means for determining the quantity or the rate of flow of a liquid as a function of its level.

Another and specific object of my present invention is to provide a simple yet highly sensitive photoelectric indicator, and one which is applicable even to colorless and combustible liquids flowing in a column of standard form and dimensions.

Other objects and advantages will be apparent and my invention itself will be best understood upon reference to the following specification and to the accompanying drawing wherein:

Figures 1 and 2 are sectional views showing alternative embodiments of my invention as applied to a column of liquid having a concave meniscus, Figure 3 is a similar view showing my invention applied to a column having a convex meniscus, and Figure 4 is a schematic view showing my invention applied to an otherwise conventional apparatus for measuring the rate of flow of a liquid.

My invention is predicated upon an appreciation of the fact, heretofore apparently unutilized, that the meniscus of even a colorless liquid is opaque as viewed along a horizontal line, and my invention may be said to reside, at least in part, in correlating the thickness of the light beam (in what may be an otherwise conventional photoelectric indicating system) with the depth of the meniscus so that, when the beam is in register, horizontally, with the meniscus, the rays of which the beam is comprised are promptly and effectively masked.

In carrying my invention into effect, I may employ an incandescent or other exciter lamp $1$ and a condensing lens system, exemplified by the convex lens elements $3$ and $5$, for achieving a light beam $7$ of the required sharpness. The light rays are directed horizontally into a light-penetrable conduit or receptacle $9$ containing the liquid $11$ whose level is to be indicated. This receptacle $9$ is preferably constituted of a transparent substance such as glass, in which event the liquid will ordinarily wet the glass and exhibit a concave meniscus. It may however be constituted of a transparent, preferably polished plastic, such for example as polystyrene, which may remain unwetted, whereby the liquid exhibits a convex meniscus. The beam is preferably brought to a focus at or adjacent to the center of the conduit $9$, as indicated at $f$, Figs. 1 and 3, though it may be focused at the point or horizontal line $f'$, Fig. 2, adjacent to the leading edge of the meniscus $13$ of the fluid. In either event, the vertical dimension $a$—$b$ or thickness of the beam at the point it impinges upon the liquid should be preferably of the same order as, or substantially no greater than, the depth $m$—$n$ of the meniscus, whereby the light rays are completely blanked out when the level of the liquid is raised (or lowered) to a position whereat the meniscus is in register with the beam. If desired, the receptacle or conduit $9$ may be provided with a narrow flat surface portion $15$ in order to minimize distortion, and the outer surface of the conduit surrounding the area at which the light enters the tube may be blackened or otherwise masked, as indicated at $17$, to ensure a beam of the desired dimensions. The phototube $19$ which is mounted on the opposite side of the conduit $9$, in the path of the beam, may be provided with a similar apertured mask 21, if desired.

My invention is not limited to the use of any particular type of photosensitive pick-up device, though I prefer to employ a photo-actuated "electron-multiplier" (such for example as an RCA type 931A), since with this latter type of tube I may dispense with the use of an auxiliary amplifier and apply the output of the pick-up directly to the signaling relay or other electrically controlled device 23 which I may select to be controlled by the level of the fluid 11.

As shown in Fig. 3, my invention is applicable to a column wherein the liquid does not wet the walls of its container and hence exhibits a convex (instead of a concave) meniscus, since in both cases the meniscus (13, Figs. 1 and 2, 13a, Fig. 3) is opaque as viewed along a horizontal line in register with the side or edges of the said curved upper surface of the liquid.

As previously indicated, one very real advantage of my invention resides in the fact that it may be employed in connection with a suitable timing device in a system for measuring the rate of flow of a liquid and wherein it is necessary or expedient to produce an indication at several points along the path of the liquid. Fig. 4 shows a typical installation arranged to test the performance of a fuel (e. g., gasoline) pump. Here the fluid is delivered by the pump 25 to a column constituted of a number of bulbous containers 27, 27a, etc. of known capacity mounted one above the other and connected by interposed transparent tubes or pipes 29, 29a, etc. of reduced diameter. An optical system 3, 5, similar to the one shown in Figs. 1 to 3, and a phototube 31, 31a are mounted adjacent to each of the several connecting pipes 29, 29a, etc. The output circuit of each of these conventional tubes 31 is connected to a common amplifier 33 and the output of the amplifier in turn is connected to a suitable mechanism, such as a recorder 35, capable of indicating the time it takes for the pump 25 to raise the level of the liquid to the several vertically spaced photo-actuated stations 31 and 31a. Here, as before described, the thickness or vertical dimension of the beam is of the same general order as the depth of the meniscus of the liquid, so that the indication provided by each beam and its associated pick-up device is accurate to a degree determined by the thickness of the opaque line which the meniscus presents to the beam or to an observer looking into the pipe along the beam.

It will now be apparent that my invention provides a simple yet highly sensitive photoelectric liquid-level indicator and one which is applicable to colorless and to combustible liquids flowing in a column of standard form and dimensions.

I claim as my invention:

1. The method of indicating a level of a column of liquid which comprises directing a beam of light substantially horizontally upon said column, modifying the thickness dimension of said beam at the point where it impinges upon said column to correspond to the depth of the meniscus of said liquid, altering the relative level of said liquid with respect to said beam to cause said beam to impinge upon said meniscus, and utilizing the effect of said meniscus upon said beam to produce the desired indication.

2. The invention as set forth in claim 1 and wherein said beam is caused to impinge upon said column at a point which is substantially in register with the center of said meniscus.

3. The invention as set forth in claim 1 and wherein said beam is caused to impinge upon said column at a point adjacent to the periphery of said column.

4. The method of indicating a level of a light penetrable column of a liquid having a meniscus which is opaque as viewed along a substantially horizontal line, said method comprising directing a spot of light of a diameter corresponding substantially to the depth of said meniscus substantially horizontally upon said column, causing said horizontally directed light to impinge upon said meniscus, and utilizing the resultant interruption of said light to produce the desired indication.

5. The method of indicating a level of a liquid in a receptacle which is wetted by the liquid and consequently exhibits a concave meniscus, said method comprising directing a beam of light having a thickness dimension no greater than the depth of said concave meniscus horizontally across the path of said liquid, causing the raised peripheral portion of the concave meniscus of said liquid to interrupt said beam, and utilizing the said interruption of said beam to produce the desired indication.

6. The method of indicating a level of a liquid in a receptacle the walls of which are not wetted in the presence of said liquid, said method comprising generating a beam of light having a thickness dimension of the order of the depth of the convex meniscus of said liquid, directing said beam of light horizontally across said receptacle in the path of said liquid, establishing relative movement between said horizontally directed beam of light and said liquid to bring said convex meniscus into register with said beam, and utilizing the resulting interruption of said beam by said meniscus to produce the desired indication.

7. Apparatus for indicating a level of a column of liquid within a light penetrable receptacle, said apparatus comprising a source of light, means for deriving from said source a beam of light of a thickness substantially no greater than the depth of the meniscus of said liquid and for projecting said beam horizontally in the path of said meniscus, and means responsive to the effect of said meniscus upon said horizontally directed beam for producing the desired indication.

8. The invention as set forth in claim 7 and wherein said beam is focused upon said column at a point which is substantially in register with the center of said meniscus.

9. The invention as set forth in claim 7 and wherein said beam is focused upon said column at a point adjacent to the periphery thereof.

10. The invention as set forth in claim 7 and wherein said receptacle is constituted of a material which is wetted by said liquid.

11. The invention as set forth in claim 7 and wherein said receptacle is constituted of a material which is not wetted by said liquid.

ALF H. HOFBERG.

REFERENCES CITED

The following references are of record in the file of this patent:

UNITED STATES PATENTS

| Number | Name | Date |
|---|---|---|
| 352,647 | Ghegan | Nov. 16, 1886 |
| 1,737,126 | Reyling et al. | Nov. 26, 1929 |
| 1,955,315 | Styer | Apr. 17, 1934 |
| 2,096,025 | Bell | Oct. 19, 1937 |